UNITED STATES PATENT OFFICE.

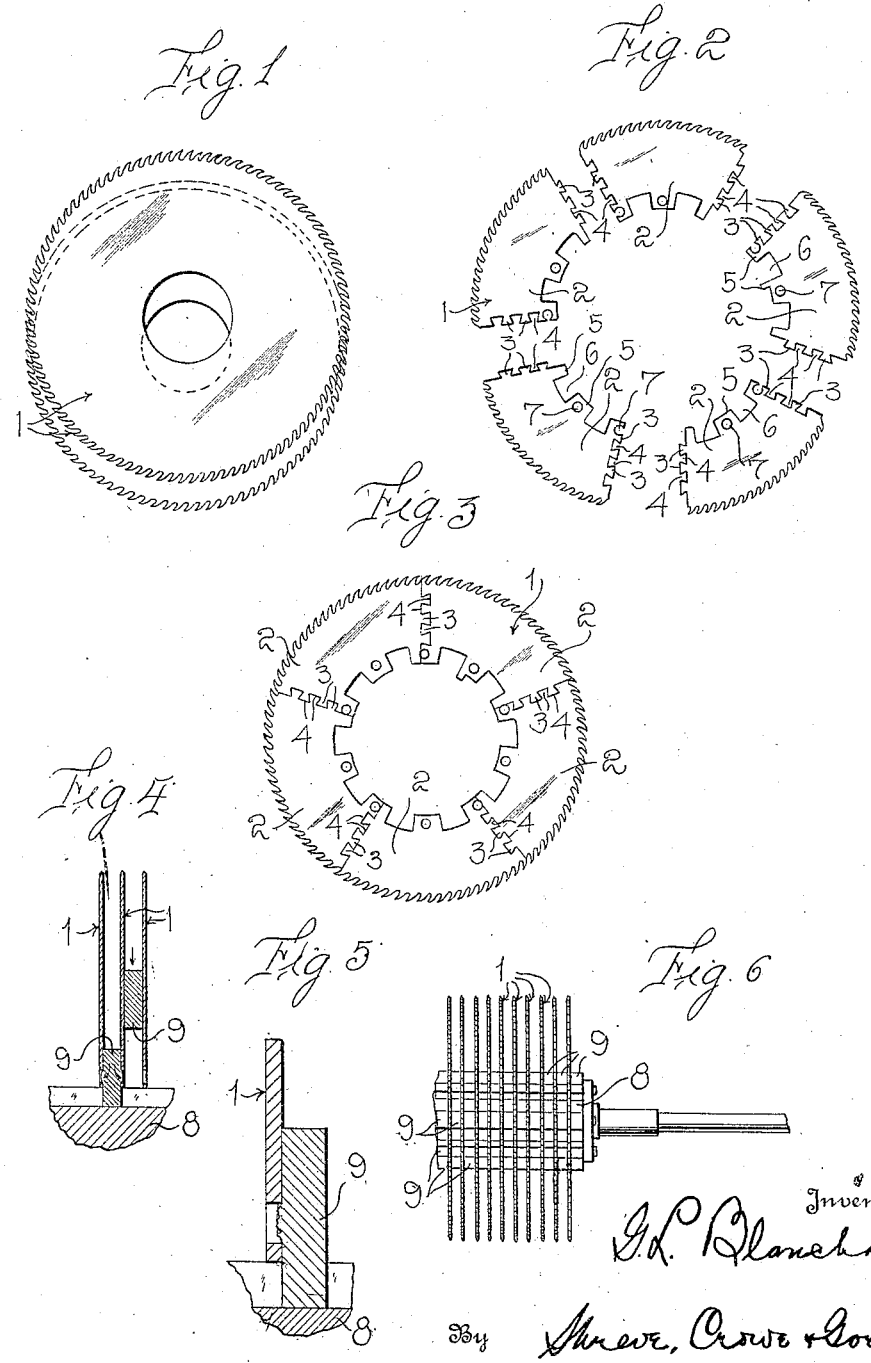

GEORGE L. BLANCHARD, OF ATLANTA, GEORGIA.

METHOD OF SAW RECONSTRUCTION.

1,306,741.      Specification of Letters Patent.    Patented June 17, 1919.

Application filed March 20, 1918. Serial No. 223,519.

*To all whom it may concern:*

Be it known that I, GEORGE LORRISON BLANCHARD, a citizen of the United States, residing at Atlanta, in the county of Fulton and State of Georgia, have invented new and useful Improvements in Methods of Saw Reconstruction, of which the following is a specification.

The present invention from a generic aspect relates to saws for cotton gins, linters and delinters, but it more specifically comprehends a method for reconstructing saws after they have been discarded as unfitted for further service.

The principal purpose of this invention is to provide a method of the character specified, by which a perfect sectional saw is obtainable from the assembled segments of a plurality of defective saws, the respective segments being united in a predetermined manner to effect a uniform cutting edge.

A further object of this invention lies in providing a tongue and groove construction at the extremes of each segment, so they may be interlocked with the rigidity of an integral structure.

Further objects of this invention are: to design a saw, having all the qualifications of one constructed in the usual manner; to conserve material ordinarily disposed of as waste, and in general to improve existing methods of construction.

With these and other objects in view, my invention consists in certain novel details of construction, combination and arrangement of parts to be more fully hereinafter set forth and claimed.

Heretofore in the ginning industry it has been customary, after the cutting edge of the saw has been worn down to an extent where further sharpening is impractical, to dispose of it as waste material at a fraction of its original cost, but this practice aside from being costly is undesirable because of the waste in material, and, therefore, it is with a view to the elimination of this loss, financial and otherwise, I have designed the method forming the subject matter of this invention.

Referring more particularly to the accompanying drawing, in which corresponding parts are indicated by similar reference characters:

Figure 1, is a perspective view, illustrating the character of old saws employed by this method;

Fig. 2, is a horizontal plan view, showing the segments in assembled relation;

Fig. 3, is a horizontal plan view, showing the segments after they have been united;

Fig. 4, is a detail sectional view, illustrating two wedges, one in position, the other being positioned;

Fig. 5, is a detail sectional view, illustrating the manner in which a portion of the wedge projects into the openings of the saw; and Fig. 6, is a side elevation, showing the saws in position upon the saw cylinder.

In carrying this method into effect, the operator selects two defective circular saws 1 of solid type (as shown in Fig. 1) which under ordinary circumstances, having been worn down to an extent prohibiting further sharpening, would be considered waste material, and from these, with an appropriate machine stamp out five segments 2, of the configuration shown in Fig. 2.

The number of segments derived from each old saw is determined by the diameter of the latter, that is to say, from a saw worn down to eleven and a half inches it is possible to obtain four segments, while from those having a diameter of eleven and a quarter to ten and a half inches, three segments may be obtained. Each segment 2, at the time it is stamped from the old saw, is formed at its extremities with flaring tongues 3 and grooves 4, while its inner curved edge is provided with projections 5 and recesses 6, said projections being apertured as at 7, for a purpose hereinafter to appear.

The required number of segments, dependent on the diameter of the saw, having been secured in the manner aforesaid, are assembled with the tongues of one segment fitting into the grooves of the abutting edge of the adjacent segment, whereupon said joint is welded in a suitable manner to form the entire assemblage into a homogeneous structure.

By arranging the parts in this manner a saw is obtained from old material, which is equal in every respect to a new one.

After the segments have been suitably united the completed saw is in readiness for positioning on the cylinder 8, which is of special design to accommodate this particular construction of circular saw. As the rapid rotary movements of the saws during operation of ginning or delinting might tend to dislodge the segments, a soft wood wedge is inserted between each of the saws, at points corresponding to the position of the openings located at the joints of the several segments, as shown in Figs. 4, 5, and 6. These wedges being of soft wood, when properly positioned between the saws, will expand so as to overlie the openings between which they are positioned, and the overlying portions will serve as braces at each joint against lateral displacement of the segments.

From the above it will be obvious, a practical and efficient saw may be constructed in a simple manner from material which otherwise would be considered waste, and different gaged saw steel utilized without ill effect.

Although in the foregoing I have set forth certain elements as best adapted to perform the functions allotted to them, it is to be understood, that various minor changes as to material, manner of uniting the segments, etc., may be resorted to within the scope of the appended claims, without departing from or sacrificing any of the principles of this invention.

Having thus described my invention, and without enumerating variations and equivalents, what I desire protected by Letters Patent is as set forth in the following claims:

1. A process of reconstructing circular saws, for ginning machines and the like, consisting in removing a plurality of segmental sections from two defective saws of the solid type, and uniting such sections in a predetermined manner to form a complete circular saw, substantially as described.

2. A process of reconstructing circular saws, for ginning machines and the like, consisting in removing a plurality of segmental sections from two defective saws of the solid type, dovetailing the edges of such sections, and uniting the latter, substantially as described.

3. A process of reconstructing circular saws, for ginning machines and the like, consisting in removing a plurality of segmental sections from two defective saws of the solid type, dovetailing the edges of such sections, uniting the latter in rigid relation, and reinforcing the several sections by means of an expansible wedge at the points of their joints, substantially as described.

G. L. BLANCHARD.

Witnesses:
J. A. ROGERS,
WILL. T. GORDON.